United States Patent Office 3,250,732
Patented May 10, 1966

3,250,732
FLAME-RESISTANT POLYURETHANES FROM A GLYCERYL BORATE
Irving S. Bengelsdorf, Tustin, Calif., and William G. Woods, Burwood, Victoria, Australia, assignors to United States Borax & Chemical Corporation, Los Angeles, Calif., a corporation of Nevada
No Drawing. Filed Mar. 7, 1963, Ser. No. 263,432
10 Claims. (Cl. 260—2.5)

This invention relates to novel flame-resistant polyurethane compositions and methods of producing said compositions.

The polyurethanes, formed by the reaction of a polyisocyanate with an organic compound having at least two groups containing reactive hydrogens, have become an increasingly useful group of plastics. For example, they find many applications as rigid and flexible foams, as adhesives, coatings, elastomers, potting resins, in textiles and many other applications. However, a major obstacle to the further expansion of the uses of polyurethanes, especially as foams, is their lack of fire retardancy. This property is especially important in the construction industry, where foams are used as insulation, sandwich panels, and structural panels. Thus, there is a real need in the art for flame-resistant polyurethane compositions.

It is, therefore, an object of this invention to provide novel flame-resistant polyurethane compositions.

It is a further object of this invention to provide a process of producing flame-resistant polyurethane compositions.

Other objects will become apparent from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

According to the present invention, there are provided flame-resistant polyurethane compositions comprising polyurethane formed by the reaction of polymethylene polyphenylisocyanate with a glyceryl borate having a boron:glyceryl mole ratio of from about 1:1.5 to about 1:3.

The polymethylene polyphenylisocyanate reactant is a reactive liquid described as having the following structure:

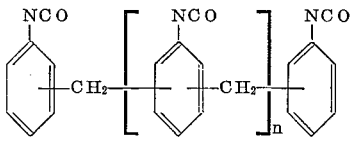

in which $n$ represents an average of about 1. A typical polymethylene polyphenylisocyanate is PAPI, a product of the Carwin Company.

The glyceryl borates employed in this invention are those which are prepared by the reaction of boric acid with glycerol in a mole ratio of from about 1.5 to 3 moles of glycerol to 1 mole of boric acid. The reaction takes place at elevated temperatures, such as about 100° C. to about 175° C., and the by-product water is removed by distillation as it is formed. An inert reaction solvent can be used if desired, but is not necessary for efficient removal of the water. However, if a solvent is used, it should be one that will form an azeotrope with water, as for example, dioxane. The progress of the reaction readily is followed by measuring the amount of water removed, and when the evolution of water has substantially ceased, the reaction is completed. The reaction takes place under ambient pressure although it appears that the reaction rate can be increased by heating the reaction mixture under slightly reduced pressure. The glyceryl borates, which are obtained as the pot residue, can be used in the polyurethane-forming reaction without further purification.

The exact compositions of the various glyceryl borate products are not known, but the materials appear to be complex mixtures having free hydroxy groups, the nature of which depend on the glycerol-boric acid ratio used. When boric acid and glycerol are reacted in a 1 to 1.5 mole ratio, the product appears to be predominantly triglyceryl biborate having three hydroxy groups per molecular unit. When a 1 to 2 mole ratio is used, the product is diglyceryl borate having three hydroxy groups per molecular unit, and when a 1 to 3 mole ratio is used the product is triglyceryl borate having six hydroxy groups per molecular unit. Each product probably contains some of each borate in addition to some polymeric-like material, however, it only being essential to the present invention that the product have a boron:glyceryl mole ratio in the range of about 1:1.5 to about 1:3.

The following examples illustrate the preparation of typical glyceryl borates useful in this invention.

*Example I.—Diglyceryl borate having boron:glyceryl mole ratio of 1:2*

A mixture of 185.5 grams (3.0 moles) of boric acid and 552.6 grams (6.0 moles) of glycerol was stirred and heated in a flask. Water began to distill from the mixture when the pot temperature reached 122° C. and was removed by means of a Dean-Stark trap. Heating was continued until the pot temperature reached 163° C. and 140 ml. of water had been collected. The flask containing the hot mixture was then connected to an aspirator vacuum system and an additional 44 ml. of water was collected by heating the mixture to 180° C. at 22 mm. pressure. A total of 182 grams of water was collected, 22 grams of which was present in the reaction mixture as an impurity in the glycerol. The product was collected as the colorless, viscous liquid pot residue weighing 548 grams; $n_D^{25}$ 1.4831. Analysis gave 5.84% B (theory for diglyceryl borate is 5.65% B).

*Example II.—Triglyceryl biborate having boron:glyceryl mole ratio of 1:1.5*

A mixture of 247.4 grams (4.0 moles) of boric acid and 575.6 grams (6 moles) of glycerol was stirred and heated as described in Example I. The pot temperature was taken to 175° C., removing 200 ml. of water, and then the reaction mixture was heated to 180° C. at 20 mm. pressure to remove an additional 37.6 grams of water. The product, which was collected as the pot residue, was a colorless, very viscous liquid weighing 571 grams. Analysis gave 7.40% boron (theory for triglyceryl biborate is 7.43% B).

*Example III.—Triglyceryl borate having boron:glyceryl mole ratio of 1:3*

A mixture of 92.1 grams (1 mole) of glycerol and 20.6 grams (0.33 mole) of boric acid in 250 ml. of dioxane was stirred at reflux temperature. Dioxane-water azeotrope was removed slowly over a 4-hour period at 89°–100° C. The remaining dioxane was then removed by heating to 120° C. under aspirator vacuum, leaving the product as 91.6 grams of a colorless, viscous syrupy residue. Analysis for boron gave 3.95% (theoretical for triglyceryl borate is 3.87% B).

The polyurethanes of the present invention are prepared by conventional polyurethane-forming procedures. For example, the polyisocyanate and glyceryl borate can be combined in a ratio of hydroxy to isocyanate groups of from about 1:1 to about 2:1 at about ambient temperature. Preferably, a catalyst such as a tertiary amine is used in the reaction mixture. If the desired product is to be a cellular foam, a blowing agent such as the fluorinated methanes is also included in the formulation. Other conventional polyurethane additives such as silicones can also be included for certain desirable characteristics.

The reaction mixture can also include other active hydrogen containing materials which will react with the isocyanate groups. Thus, the glyceryl borate need not represent the total hydroxy component since a portion can be replaced with non-boron compounds which can react with the isocyanate to give polyurethanes with modified physical properties, yet retaining the desired flame-resistant properties imparted by the glyceryl borate.

If desired, the polyurethanes can be cured at elevated temperatures without adversely affecting the flame-resistant properties.

The following examples are presented to illustrate the preparation of typical polyurethane compositions of this invention, but it is to be understood that the invention is not to be limited to the specific examples given.

*Example IV*

A polyurethane foam was prepared in a 1 pint paper cup by weighing directly in the cup 16.0 grams of polymethylene polyphenylisocyanate, 9.3 grams of triglyceryl borate, 0.4 gram of triethylenediamine-1,2,6-hexanetriol mixture (1:2 by weight), 0.2 gram of triethylamine, 0.2 gram of DC-113 Silicone (a product of Dow-Corning Corporation described as a silicone-glycol copolymer) and 6.0 grams of trichlorofluoromethane. The mixture was stirred rapidly with a high-speed disc stirrer and the foam allowed to form. The resultant rigid foam had a density of 3.54 p.c.f. A strip sample was prepared and the burning properties determined as described in ASTM D-635-56T test procedure. It was self-extinguishing 14 seconds after removal of the flame.

*Example V*

A polyurethane foam was prepared according to the procedure of Example IV except that 12.6 grams of diglyceryl borate was used instead of the triglyceryl borate. The resultant rigid foam was found to have a density of 3.72 p.c.f., and was self-extinguishing 7 seconds after removal of the flame in the burning test.

*Example VI*

A polyurethane foam was prepared according to the procedure of Example IV except that 19.1 grams of triglyceryl biborate was used instead of the triglyceryl borate. The resultant foam, which formed very fast, was found to have a density of 4.15 p.c.f. and was self-extinguishing immediately after removal of the flame in the burning test.

Polyurethane foams prepared by reaction of polymethylene polyphenylisocyanate with a non-boron glycerol, tris(hydroxypropyl)glycerol, were not self-extinguishing in the burning test.

Thus, as illustrated in the above examples, this invention has provided novel flame-resistant polyurethane compositions and processes for producing said compositions.

Other modes of applying the principle of the invention may be employed, change being made as regards the details described, provided the features stated in any of the following claims or the equivalent of such be employed.

We, therefore, particularly point out and distinctly claim as our invention:

1. Flame-resistant polyurethane compositions comprising polyurethane formed by the reaction of polymethylene polyphenylisocyanate with a glyceryl borate in a hydroxy:isocyanate group ratio of from about 1:1 to about 2:1, said glyceryl borate having a boron:glyceryl mole ratio of from about 1:1.5 to about 1:3 and having from about 3 to about 6 hydroxy groups per molecular unit.

2. Flame-resistant polyurethane compositions according to claim 1 in which said glyceryl borate is triglyceryl borate having a boron:glyceryl mole ratio of about 1:3.

3. Flame-resistant polyurethane compositions according to claim 1 in which said glyceryl borate is diglyceryl borate having a boron:glyceryl mole ratio of about 1:2.

4. Flame-resistant polyurethane compositions according to claim 1 in which said glyceryl borate is triglyceryl biborate having a boron:glyceryl mole ratio of about 1:1.5.

5. A cellular, flame-resistant polyurethane foam prepared by the catalytic reaction of polymethylene polyphenylisocyanate with a glyceryl borate in the presence of a blowing agent, the hydroxy:isocyanate group ratio in said reaction being from about 1:1 to about 2:1, wherein said glyceryl borate has a boron:glyceryl mole ratio of from about 1:1.5 to about 1:3 and has from about 3 to about 6 hydroxy groups per molecular unit.

6. In the process of producing a polyurethane by reacting a polymethylene polyphenylisocyanate with a polyhydroxy compound in a hydroxy:isocyanate group ratio of from about 1:1 to about 2:1, the improvement which comprises employing a glyceryl borate as a polyhydroxy compound in said reaction thereby forming a flame-resistant polyurethane composition, said glyceryl borate having a boron:glyceryl mole ratio of from about 1:1.5 to about 1:3 and having from about 3 to about 6 hydroxy groups per molecular unit.

7. The process of claim 6 in which said glyceryl borate is triglyceryl borate having a boron:glyceryl mole ratio of about 1:3.

8. The process of claim 6 in which said glyceryl borate is diglyceryl borate having a boron:glyceryl mole ratio of about 1:2.

9. The process of claim 6 in which said glyceryl borate is triglyceryl biborate having a boron:glyceryl mole ratio of about 1:1.5.

10. The process of claim 6 in which said reaction takes place in the presence of a blowing agent, thereby forming a cellular polyurethane foam.

References Cited by the Examiner

UNITED STATES PATENTS

| 2,084,261 | 6/1937 | Boughton et al. | 260—462 |
| 3,072,582 | 1/1963 | Frost | 260—2.5 |
| 3,100,752 | 8/1963 | Donbrow | 260—77.5 |
| 3,127,404 | 3/1964 | Mascioli | 260—2.5 |
| 3,189,565 | 6/1965 | Woods et al. | 260—2.5 |

FOREIGN PATENTS 1,118,448  11/1961  Germany.

LEON J. BERCOVITZ, *Primary Examiner.*

DONALD E. CZAJA, *Examiner.*

J. J. KLOCKO, *Assistant Examiner.*